Aug. 5, 1969    F. V. ATKESON    3,459,523
METHOD AND APPARATUS FOR THE MANUFACTURE OF FLOAT
GLASS ON A BI-LEVEL SUPPORT BATH
Filed Aug. 4, 1966    2 Sheets-Sheet 1

INVENTOR
FLORIAN V. ATKESON
ATTORNEYS

United States Patent Office 3,459,523
Patented Aug. 5, 1969

3,459,523
METHOD AND APPARATUS FOR THE MANUFACTURE OF FLOAT GLASS ON A BI-LEVEL SUPPORT BATH
Florian V. Atkeson, Springdale, Pa., assignor to PPG Industries, Inc., a corporation of Pennsylvania
Filed Aug. 4, 1966, Ser. No. 570,219
Int. Cl. C03 *18/02*
U.S. Cl. 65—99        7 Claims

ABSTRACT OF THE DISCLOSURE

In the float glass process, to make glass of thicknesses differing from the equilibrium thickness, a force is applied to a portion of the body of the supporting liquid below the surface thereof so as to maintain the surface thereabove at a level different from that of adjacent surfaces and thus presenting a continuous casting or forming surface for molten glass.

---

Figure 1:
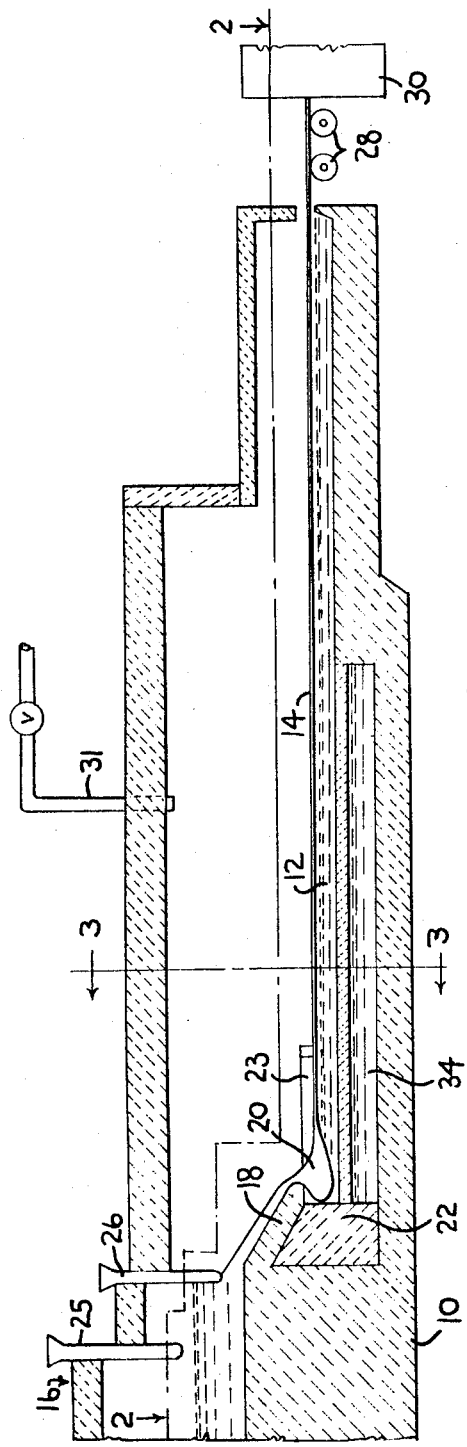

This invention relates to the manufacture of flat glass and especially to the manufacture of flat glass on a bath of molten metal, such as tin or tin alloy.

When molten glass is supported on the surface of molten tin and is permitted to flow unhindered, it will assume a thickness, except for the edge portions thereof, known as "equilibrium thickness." In the case of the usual soda-lime-silica glass of plate glass composition, the equilibrium thickness on molten tin is 0.270 inch or approximately one-quarter inch. The edge portions of such a ribbon terminate in knife edges joined to the main portion of the glass by curved surfaces, so that essentially the glass thickness in the edge portions varies from substantially zero at the terminal edges to equilibrium thickness. Such edge portions are generally one-half to one inch in width, i.e., a minor portion of the usual commercial ribbon of glass.

For some applications, the "equilibrium" thickness glass is desired, as for example, in the manufacture of mirrors, store fronts, etc. However, the automotive trade requires glass of thicknesses less than equilibrium. For windshields, two one-eighth inch sheets of glass are laminated to a plastic interlayer. Back lights and side lights are generally tempered and are preferably three-sixteenths inch thick or less. Thicker than equilibrium glass is required for doors, etc. Thus, it is desirable to be able to produce glass in a variety of thicknesses.

Heretofore when thinner than equilibrium glass has been produced commercially, the glass has been attenuated both laterally and longitudinally. Lateral attenuation lessens the reduction in width when the ribbon is stretched. Because of unequal temperature conditions within the glass itself, attenuation is not the most desirable method for producing thinner than equilibrium glass because variations in thickness, both transverse to and along the length of the ribbon will occur.

Another method for producing glass of different than equilibrium thickness has been proposed. In this method, as disclosed and claimed in U.S. Patent No. 3,241,939, a fluid pressure is applied to the glass inwardly of its edges which is different from the pressure on the supporting bath at the edges of the glass. If the pressure on the glass inwardly of the edges is greater than that on the supporting bath at the edges of the glass, the glass formed is less than equilibrium thickness. If the reverse is true the glass thickness is greater than equilibrium thickness.

It has been found that when molten glass is deposited on a molten metal support having different levels, glass can be produced with central portions of a thickness or thicknesses differing from equilibrium thickness. The central portions may be less or more than equilibrium thickness depending upon the supporting levels of the bath and the manner of operation.

In order to carry out the process just described, it has been proposed to provide multi-level supporting baths by separating the bath mechanically into various longitudinal sections. Means are then provided for adjusting and maintaining the desired levels. Materials used for dividing the bath into sections must be chosen to be non-wetting with the glass, and to be non-reactive with the glass, the metal of the bath and the atmosphere above the bath.

In all of the processes just described, the edge portions of the glass assume a particular configuration, i.e., a knife edge joined by curved surfaces to an essentially flat surface of the main body of the glass.

It is proposed, by this invention, in a process of producing flat glass wherein molten glass is supported on a bath of molten metal, to utilize the phenomenon that the edge portions of the glass will assume equilibrium configuration including knife edges and curved surfaces joined to marginal portion of the main body of glass having equilibrium thickness regardless of the thickness of the central portion of the glass, to produce various thicknesses of glass. According to this invention, a continuous and completely adjustable multi-level casting and supporting surface on the metal supporting bath is utilized. This is accomplished by using hydrodynamic principles of pumping molten metal of the bath to provide a multi-level supporting surface. It is possible to produce glass either thicker or thinner than equilibrium thickness while the equilibrium edge configuration remains unchanged.

In the process of this invention, molten metal is pumped through longitudinally extending slots angled either toward the center or edges of the bath, depending upon the glass thickness desired, so as to attain a higher level than the other portions of the bath. Glass cast on this bi-level surface will assume equilibrium configuration at the edges and the particular desired thickness in the main body.

Figure 2:
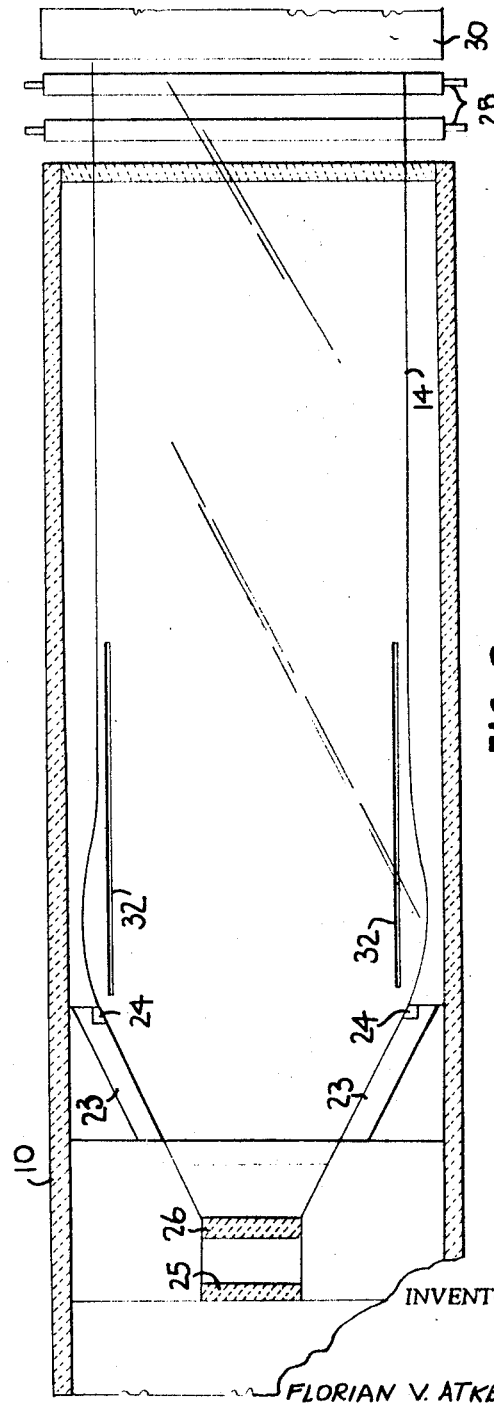
Figure 3:
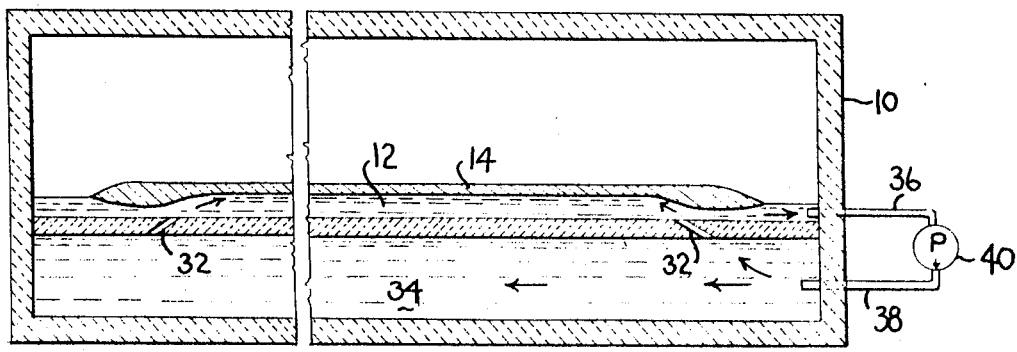
Figure 4:
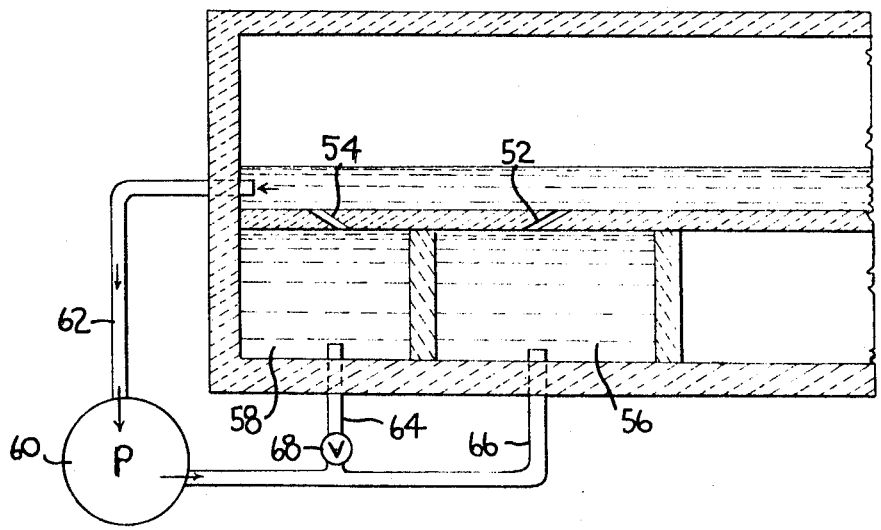

To more fully understand this invention, attention is directed to the following drawings, in which FIG. 1 is a longitudinal section through a typical float glass-producing apparatus using this invention, FIG. 2 is a view taken on line 2—2 of FIG. 1, FIG. 3 is a sectional view taken on line 3—3 of FIG. 1, and FIG. 4 is a view similar to FIG. 3 showing a different embodiment of the invention.

Referring now to the drawings, FIGS. 1 and 2 illustrate a typical float glass-producing apparatus incorporating the present invention. The apparatus includes a float tank 10 containing a bath of molten metal 12 on which a ribbon of glass 14 is formed and supported. The molten glass is discharged from a glass melting tank 16 and flows over a spout 18 onto the molten metal, collecting at a heel or onion 20 in what is known as a wet-back because the glass flows backward to the wet-back tile 22 and forwardly into the ribbon 14 as well as sidewise to form the ribbon. Restrictor tiles 23 control the width of the ribbon which discharges therefrom at about final width. Kiss-off blocks 24 constructed of graphite, so as to be non-wetting with the glass, are located at the ends of the tiles 23. Tweels 25 and 26 control the flow of molten glass onto the bath 12. The ribbon of glass is carried forward at a rate such that it does not contact the side walls of the tank 10 but, in the absence of external forces which alter the thickness, not such a rate that appreciable longitudinal attenuation occurs. The tractive force for moving the ribbon is the lehr rolls, not shown. The ribbon of glass exits from the tank and is supported on take-out rolls 28 and conveyed into an annealing lehr 30 for controlled cooling. From the annealing lehr, the glass is edge trimmed and cut to desired sizes.

The glass in its travel through the tank 10 levels or smooths out in about the first third of the length of the tank 10. At that location, the viscosity and surface tension of the glass is such that it will not further reduce in thickness in the absence of external forces thereon and will not further level out. The glass has thus reached a zero grow-back condition. Further travel through the tank 10 conditions the glass ribbon 14 for removal from the tank without damage to its surfaces. To protect the metal of the bath from oxidization, a controlled atmosphere is provided by means of conduit 31, with an appropriate valve in the line from a suitable gas source. The gas generally introduced is nitrogen or a mixture of nitrogen and hydrogen at a pressure just slightly above ambient, which prevents or eliminates the ingress of ambient atmosphere into the tank.

In addition to the above, the bottom of the tank 10, at least in the area where the glass is in its formative condition, is provided with elongated slots extending parallel to the sides of the tank which open into a chamber 34 containing molten metal. A conduit 36 extends through a side wall of the tank 10 into the bath 12 and a conduit 38 extend through the side wall of the tank 10 into the chamber 34. A pump 40 connects the conduits 36 and 38 for pumping molten metal from the bath 12 into the chamber 34, through the elongated slots or grooves 32, into the bath 12 and so forth. As will be noted, especially in FIG. 3, the slots are angled toward the central area of the tank 10, so that when molten metal is pumped, as noted, the depth of the bath in the central area of the tank 10 is greater than the depth adjacent the sides thereof. This arrangement produces glass of thicknesses less than equilibrium thickness, it being remembered that the thickness and configuration of the glass at the edge portions is the same as in the equilibrium process. It can also be seen that a continuous casting and/or supporting multilevel surface is provided on the metal bath 12. By reversing the angularity of the slots 32 thicker than equilibrium glass can be produced in the central area of the ribbon.

While the slots have been shown in FIGS. 1 and 2 as extending only partly along the length of the tank 10, it is to be understood that they can extend along the entire length thereof. Additional pumps can be provided if found necessary and desirable.

FIG. 4 illustrates another embodiment of the invention in which a pair of elongated slots 52 and 54 are provided adjacent the sides of the tank 10 for at least the length of the tank in which the ribbon is in its formative condition. Each slot has an associated chamber 56 and 58, respectively, into which molten metal is pumped by pump 60 from the bath 12 through conduit 62 and conduits 64 and 66, respectively. A three-way valve 68 is provided to select the chamber into which pumping occurs. It can readily be seen that when metal is pumped into chamber 56 and through slot 52, thinner than equilibrium glass will be produced; when metal is pumped into chamber 58 and through slot 54, thicker than equilibrium glass will be produced.

Generally the best results are obtained when the slots are angled approximately 35° from the vertical; however, angles of 15° to 55° from the vertical are satisfactory.

It can readily be appreciated that the metal-containing chambers below the slots can be constructed in sections and thus serve to temperature condition the glass by glass metal contact. For example, progressively cooler metal can be introduced to progressively cool the glass so that it can be lifted from the bath without surface damage.

EXAMPLE I

An apparatus is constructed of clay refractory with an interior dimension of 50 inches in length, 20 inches in width and 6 inches in height with a horizontal carbon member spaced 1 inch from the bottom therein. An entrance and an exit slot are provided for ingress and egress of glass. The carbon member is provided with spaced elongated slots extending the length thereof. The slots are 1/16-inch wide and angled 35 degrees from the vertical and toward one another. The slots are spaced at the top of the member, a distance of 2 inches from the adjacent side wall of the tank. Conduits extend through the wall of the tank just above and below the member and a pump is connected to the conduits.

Tin is introduced into the tank so as to fill the space below the member and to cover the member at a depth of two inches. The pump is operated to pump tin from above the member to below the member and then through the slots to cause a central ridge to be formed. At an effective pressure difference of 0.032 p.s.i. between the two levels of tin, the central ridge of tin is 1/8-inch above the edges thereof.

Heating means are provided to maintain the temperature in the tank and in the tin so that the temperature at the entrance is 2100° F. and at the exit end is 1600° F.

A ribbon of soda-lime-silica glass of the usual plate composition with a width of 16 inches and a thickness of 1/4-inch is introduced onto the tin bath and is remelted, carried thereacross and removed. The ribbon removed has a central portion of 12 inches in width and a thickness of 1/8-inch with edge portions 1/4-inch thick.

EXAMPLE II

In a laboratory feasibility test, an apparatus was constructed having hot and cold water recirculating pumps, sources of hot (55° C.) water and cold (25° C.) water for pumping water into and out of a container having a horizontally disposed divider therein. The divider was provided with spaced grooves 0.050 to 0.054 inch wide, each groove being angled toward the center at an angle of 35° from the vertical. Each groove was 15 inches in length and the grooves were spaced 5 inches apart. The hot end water flow was 3230 cubic centimeters per minute and the cold end water flow was 1670 cubic centimeters per minute.

Parawax was melted in a pot at 55° C. and poured onto the water where it flowed to equilibrium with free edges and was moved along the water where it was cooled at a temperature of 25° C., so as to solidify and be removed from the water.

The product, after removal from the bath was measured to determine its thickness. The edge portions, at their maximum measured 0.100 inch in thickness; the central portion measured 0.045 to 0.055 inch in thickness or approximately one-half the measured edge equilibrium thickness.

The hydrodam, i.e., the central portion of the supporting surface created by the pumps, appeared, in the absence of the parawax, to be about one-sixteenth inch in elevation above the edge portions.

I claim:

1. A process of forming flat glass wherein a mass molten glass is supported on a bath of a liquid having a density greater than said glass, the steps which comprise,
    establishing a laterally continuous supporting bath of said liquid having an upper surface providing a continuous glass supporting surface,
    applying a force at least two locations within the body of said liquid and beneath the upper surface thereof, said force being directed toward said surface of said bath and being of sufficient magnitude to form a supporting surface on a portion of the surface of said liquid having a level different than that of other portions of the surface of said liquid beneath which forces are not exerted thereupon, said liquid supporting surface having a different level being capable of supporting molten glass thereupon until said glass is formed.

2. The process of claim 1, wherein a hydrodynamic force is applied to said bath to maintain said different levels.

3. The method of claim 1 wherein said force is applied to a central portion of said bath and said glass formed therein has a central portion of less thickness than edge portions thereof.

4. The method of claim 1 wherein said force is applied to portions of said bath flanking a central portion thereof and said glass formed thereon has a central portion of greater thickness than the edge portions thereof.

5. Aparatus for forming a glass ribbon comprising
a tank for containing a liquid on which molten glass is formed
a horizontal divider in said tank spaced below the surface of said liquid and having liquid therebelow
spaced parallel slots in said divider communicating the liquid below and above said divider, and
means for applying a pressure to the liquid below said divider to cause it to flow through said slots and form a bi-level surface above said divider.

6. Apparatus as recited in claim 5 wherein said slots are angled 15° to 55° from the vertical.

7. Apparatus as recited in claim 6 wherein said slots are angled 35° from the vertical.

References Cited
UNITED STATES PATENTS 3,317,302    5/1967    Mission _____ 65—91 X S. LEON BASHORE, Primary Examiner R. V. FISHER, Assistant Examiner U.S. Cl. X.R.

65—65, 182, 184